9899X
C. Waterman,
Brick Machine.
Patented July 2, 1836.
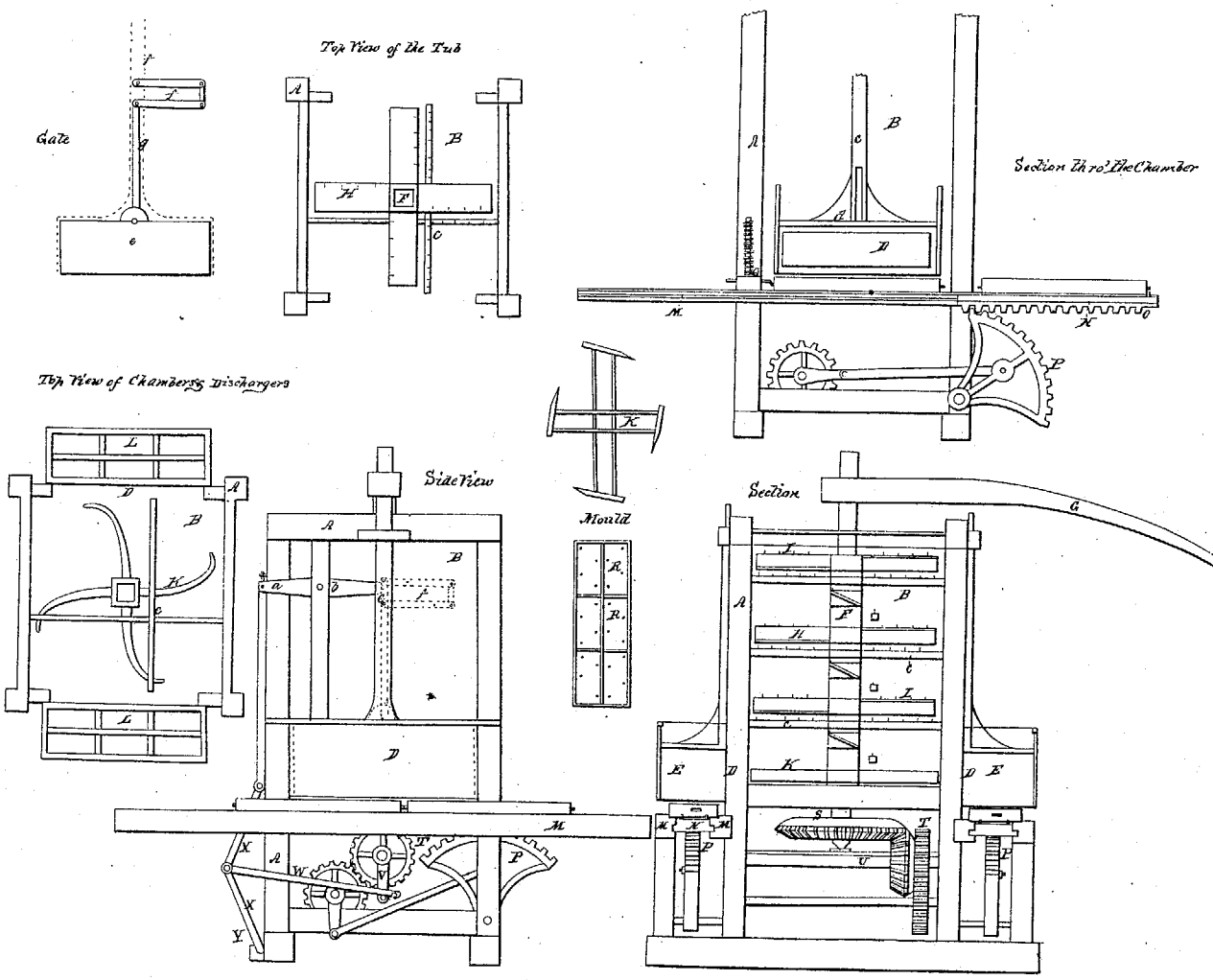
AM. PHOTO-LITHO. CO. N.Y. (OSBORNE'S PROCESS.)

7/2/1836 9899X

382. July 2-36

Calvin Waterman
Bath Maine
Letters Patent

The schedule referred to in these Letters Patent and making part of the same containing a description in the words of the said Calvin Waterman himself of his improvement in the machine for making bricks Be it known that I Calvin Waterman of the town of Bath in the County of Lincoln and State of Maine have invented a new and useful improvement in the machine for making bricks which is described as follows reference being had to the annexed drawings of the same making part of this specification This machine consists of a suitable frame A in the center of which is constructed a mixing box B in which the clay is tempered having cross bars C. to cut up the clay and oblong appertures D at the bottom through which it is discharged into the receiving chambers E herein-after mentioned. In the center of the box or tub is a perpendicular shaft F with a sweep G across its upper end to the end of which sweep the power is applied if horses are used for propelling the machine Upon this shaft are put a number of bevelled knives H with vertical spurs I for cutting the clay. At the bottom of the mixing tub and upon the shaft are four dischargers K for pushing the clay into the chambers.

At each end of the mixing tub and where the discharging apertures are made is constructed a chamber E to receive the clay before being pushed into the moulds with a grate L at the bottom of each. Below the chambers are constructed parallel grooved ways M in which the carriages N carrying the moulds slide backward and forward by means of racks O and segment cogwheels P hereafter described. At one end of each chamber is a metallic striker Q regulated by spiral springs: movable pistons R are placed

7/2/1836 9899X in the moulds for facilitating the discharge of the bricks. The pressure
is given by means of a large cog wheel S at the bottom of the per=
pendicular or main shaft. E working into a small vertical cog
wheel T fixed on a horizontal shaft. U having on its end a crank
V from the wrist of which leads a connecting rod W to short bars
X connected together forming a toggle joint one end of which
works in a permanent concave block Y at the foot of the frame
- the other end is attached to one end of a lever a turning
and bolt or pin b the other end of the lever being attached to the
rod C of the piston screws are placed at the end of the toggle joint
where it is connected with the lever for regulating the pressure
of the brick and when the crank has turned so far as to straighten
the toggle joint the maximum of power is obtained raising the
end of the lever a and depressing the other end of said lever and
with it the piston d and thus pressing the clay through the gate
into the moulds; whilst this operation is going on that of closing
the discharging aperture by the gate e is effected by means of a
connection of levers f and rods g with the same power causing
the gate to be closed before the piston has arrived at the bottom
of the chamber and whilst the pressing is effected the carriage
is moved back for an empty mould and as it advances with the
mould the piston raises, the filled mould is pushed forward and
the empty one takes its place: this is accomplished by means
of another crank shaft and cog wheel in connection with a
segment cog wheel and rod the cog wheel being turned by the
first mentioned vertical cog wheel working into it. This
turns the crank shaft from whose wrist extends a connecting
rod attached to the segment cog wheel which is made
to vibrate to the right or left at the same time it works in
the rack under the carriage causing it to pass in and out
from under the chamber. Whilst the carriage is running in
the piston and gate are raising and the clay is passing into
the chamber produced by the revolving motion of the discharges

7/2/1836 9899X

The bricks are struck by the metallic striker in passing under it and are then removed to the place of drying. The power may be produced by horses steam or in any mode preferred On the other side of the mixing tub is a similar arrangement of machinery to that just described for moulding and pressing bricks and is operated in a similar manner

What I claim as my invention and which I desire to secure by Letters Patent consists in the combination arrangement and adaptation of certain known mechanical principles for the purpose of moulding and pressing bricks as before specified and described

Witnesses
A Snyder
Wm P Elliot

Calvin Waterman

[illegible]

[illegible] Received October 22.d 1853 and recorded [illegible] the same day

1080